US009182046B2

(12) United States Patent
Rull et al.

(10) Patent No.: US 9,182,046 B2
(45) Date of Patent: Nov. 10, 2015

(54) PRESSURE RETENTION VALVE

(75) Inventors: Jana Rull, St. Georgen im Schwarzwald (DE); Alexander Bubb, Plankstadt (DE); Bernd Freissler, Dielheim (DE)

(73) Assignee: ProMinent GmbH, Heidelberg (DE)

( * ) Notice: Subject to any disclaimer, the term of this patent is extended or adjusted under 35 U.S.C. 154(b) by 632 days.

(21) Appl. No.: 13/394,922

(22) PCT Filed: Oct. 12, 2010

(86) PCT No.: PCT/EP2010/065283
§ 371 (c)(1),
(2), (4) Date: Mar. 8, 2012

(87) PCT Pub. No.: WO2011/045318
PCT Pub. Date: Apr. 21, 2011

(65) Prior Publication Data
US 2012/0168005 A1 Jul. 5, 2012

(30) Foreign Application Priority Data
Oct. 16, 2009 (DE) .......................... 10 2009 045 773

(51) Int. Cl.
*F16K 17/20* (2006.01)
*F16K 17/04* (2006.01)
*F16K 17/06* (2006.01)

(52) U.S. Cl.
CPC ................. *F16K 17/04* (2013.01); *F16K 17/06* (2013.01); *Y10T 137/7923* (2015.04); *Y10T 137/7925* (2015.04); *Y10T 137/7929* (2015.04)

(58) Field of Classification Search
CPC .............. F16K 17/04; Y10T 137/7925; Y10T 137/7929; Y10T 137/7923
USPC .............. 137/484.2, 497, 536, 538, 540, 469, 137/510, 494; 251/282, 331
See application file for complete search history.

(56) References Cited

U.S. PATENT DOCUMENTS

| 645,722 A | * | 3/1900 | Holmes | .................... 137/543.23 |
| 4,022,236 A | | 5/1977 | Dumont et al. | |
| 5,725,019 A | | 3/1998 | Kohlstädt | |
| 5,829,473 A | * | 11/1998 | Hajbi et al. | .................... 137/315 |

(Continued)

FOREIGN PATENT DOCUMENTS

| CN | 2060494 U | 8/1990 |
| CN | 2093935 U | 1/1992 |

(Continued)

OTHER PUBLICATIONS

International Search Report issued on Mar. 4, 2011 in International PCT Application No. PCT/EP2010/065283 filed Oct. 12, 2010.

(Continued)

*Primary Examiner* — Kevin Lee
*Assistant Examiner* — P. Macade Nichols
(74) *Attorney, Agent, or Firm* — Drinker Biddle & Reath LLP (57) ABSTRACT

A pressure retention valve including a housing having an inlet passage and an outlet passage that can be connected together and a separating diaphragm subdividing the housing into two portions, wherein, in operation of the valve, a first portion conveys fluid and a second portion is fluid-free. The valve further includes a valve seat defining an end of the inlet passage, arranged in the fluid-conveying portion of the housing, and has a first sealing surface, a shut-off body which is arranged movably in the fluid-conveying portion of the housing and has a second sealing surface, and a spring element having a spring force, which is arranged in the fluid-free portion of the pressure retention valve. The spring element is so arranged that its spring force prestresses the second sealing surface in the direction towards the first sealing surface so that in a position of the shut-off body that closes the valve the sealing surfaces are in engagement with each other and the shut-off body separates the inlet passage from the outlet passage. The inlet passage is so arranged that a fluid flowing in through the inlet passage in operation of the valve is applied to the shut-off body in such a way that the fluid exerts on the shut-off body a force which acts in opposition to the spring force of the spring element. The shut-off body has a guide portion which extends into the inlet passage, and the inlet passage is portion-wise of such a design configuration that it forms a guide bush in which the guide portion of the shut-off body is guidedly received.

12 Claims, 7 Drawing Sheets

(56) References Cited

U.S. PATENT DOCUMENTS 5,964,446 A * 10/1999 Walton et al. ............... 251/127
2008/0251146 A1 10/2008 Folk

FOREIGN PATENT DOCUMENTS

| | | |
|---|---|---|
| EP | 0 759 132 | 8/1998 |
| JP | 2001-289342 | 10/2001 |
| WO | 90/08279 | 7/1990 |

OTHER PUBLICATIONS

Office Action mailed Oct. 17, 2013 in Chinese Patent Application No. 201080046809.8 (with English translation) (19 pages).

* cited by examiner

PRESSURE RETENTION VALVE

CROSS REFERENCE TO RELATED APPLICATIONS

This application is a National Stage of International Application No. PCT/EP2010/065283 filed Oct. 12, 2010, and which claims benefit of German Patent Application No. 10 2009 045 773.9 filed Oct. 16, 2009, both of which are herein incorporated by reference in their entirety.

The present invention concerns a pressure retention valve comprising a housing having an inlet passage and an outlet passage, wherein the inlet passage and the outlet passage can be connected together, a separating diaphragm subdividing the housing into two portions, a first portion conveying fluid in operation of the valve and a second portion which is fluid-free in operation of the valve, a valve seat which is arranged in the fluid-conveying portion of the housing and has a sealing surface, wherein the valve seat defines an end of the inlet passage, a shut-off body which is arranged movably in the fluid-conveying portion of the housing and has a sealing surface, and a spring element having a spring force, which is arranged in the fluid-free portion of the valve, wherein the spring element is so arranged that its spring force prestresses the sealing surface of the shut-off body in the direction towards the sealing surface of the valve seat so that in a position of the shut-off body that closes the pressure retention valve the sealing surfaces are in engagement with each other and the shut-off body separates the inlet passage from the outlet passage, and wherein the inlet passage is so arranged that a fluid flowing in through the inlet passage in operation of the valve is applied to the shut-off body in such a way that the fluid exerts on the shut-off body a force which acts in opposition to the spring force of the spring element.

Pressure retention valves are generally used to obtain in the outlet region of pumps, in particular metering pumps, the necessary counterpressure for reliable operation of the pump. In that case the counterpressure valve is generally not a component part of the pump but is disposed in the installation downstream of the pump at any suitable location in the conveyor direction of the fluid to be conveyed.

EP 0 759 132 B1 discloses a pressure retention valve of the kind set forth in the opening part of this specification, which between the separating diaphragm and the valve seat has a guide disc displaceably guiding the valve stem, wherein the guide disc surrounds the valve stem forming a narrow annular gap acting as a throttle location. The throttle location is intended to prevent fluid occurring under pressure in the fluid-conveying portion of the housing of the pressure retention valve acting on the separating diaphragm and exerting by means thereof a force on the spring element in opposite relationship to its spring force so that the closing force of the shut-off body is reduced.

The narrow annular gap between the valve stem and the guide disc in the state of the art, through which no amount of fluid or only quite small amounts of fluid flow, tends to foul up, whereby the operational capability of the valve can be impaired.

In comparison the object of the present invention is to provide a pressure retention valve which avoids that problem.

That object is attained by a pressure retention valve comprising a housing having an inlet passage and an outlet passage, wherein the inlet passage and the outlet passage can be connected together, a separating diaphragm subdividing the housing into two portions, a first portion conveying fluid in operation of the valve and a second portion which is fluid-free in operation of the valve, a valve seat which is arranged in the fluid-conveying portion of the housing and has a sealing surface, wherein the valve seat defines an end of the inlet passage, a shut-off body which is arranged movably in the fluid-conveying portion of the housing and has a sealing surface, and a spring element having a spring force, which is arranged in the fluid-free portion of the pressure retention valve, wherein the spring element is so arranged that its spring force prestresses the sealing surface of the shut-off body in the direction towards the sealing surface of the valve seat so that in a position of the shut-off body that closes the pressure retention valve the sealing surfaces are in engagement with each other and the shut-off body separates the inlet passage from the outlet passage, wherein the inlet passage is so arranged that in operation of the valve a fluid flowing in through the inlet passage is applied to the shut-off body in such a way that the fluid exerts on the shut-off body a force which acts in opposition to the spring force of the spring element, wherein the shut-off body has a guide portion which extends into the inlet passage, and the inlet passage is portion-wise of such a design configuration that it forms a guide bush in which the guide portion of the shut-off body is guidedly received.

According to the invention guidance for the shut-off body or valve piston, in comparison with the state of the art, has been moved out of the region between the valve seat of the housing and the separating diaphragm into the region of the inlet passage, upstream of the valve seat in the fluid conveying direction. In that way the fluid to be conveyed completely flushes through the guide means of the shut-off body in operation of the valve at regular intervals and the deposit of impurities and contamination in a gap between the guide portion of the shut-off body and the guide bush is prevented so that the reliability of the valve increases.

Separation of the housing by means of the separating diaphragm serves as in the state of the art to subdivide the housing into a portion for conveying fluid in operation of the valve and a portion which is fluid-free in operation of the valve. Arranging the spring element in the fluid-free portion of the housing means that it is not attacked by the fluids to be conveyed, which considerably improves the service life of the valve.

The valve according to the invention is closed by the spring force acting on the shut-off body and opened by the forces which are exerted by the fluid applied to the shut-off body in the inlet passage and which are directed in opposite relationship to the spring force of the spring element.

A large number of mutually complementary forms are suitable for forming the guide portion of the shut-off body and the guide bush in the inlet passage. A preferred embodiment however is one in which the guide bush is of a substantially hollow-cylindrical shape with a cylindrical inside wall which both delimits the inlet passage and also forms the guide bush. Completely different forms of guide portions can be received in such a hollow-cylindrical guide bush.

In an embodiment a decisive aspect for the guide portion of the shut-off body is that it has at least one passage which extends substantially parallel to the inlet passage of the housing and through which the fluid to be conveyed flows in operation of the valve. That prevents the guide portion of the shut-off body, that extends into the inlet passage, blocking the inlet passage or constricting the cross-section through which the fluid can be conveyed to such an extent that effective fluid conveyance is no longer possible.

In addition an advantageous embodiment is one in which the guide portion has at least one passage permitting a flow of fluid in a direction perpendicularly to the inlet passage so that fluid flowing through the inlet passage, when the valve is opened, can flow through between the sealing surfaces of the valve seat and the shut-off body.

In an embodiment of the invention the guide portion has a plurality of guide vanes extending substantially in the radial direction and spaced from each other in the peripheral direction so that in the opened condition of the valve fluid can flow out of the inlet passage through the guide portion of the shut-off body and through an intermediate space between the first and second sealing surfaces into the outlet passage.

In such an embodiment a flow of fluid is possible in a direction parallel to the inlet passage and thus towards the shut-off body, and also in a direction perpendicularly to the direction of the inlet passage, between the blade-like guide vanes, so that in the opened condition of the valve the fluid can flow through between the two sealing surfaces of the shut-off body and of the valve seat.

When in such an embodiment of the invention the guide bush formed by the inlet passage is of a hollow-cylindrical configuration, it is desirable if the outwardly disposed end faces of the guide vanes are all on the contour of a circle which is of a slightly smaller radius than the radius of the inside wall of the hollow cylinder of the guide bush.

In an embodiment of the invention the guide portion of the shut-off body has a hollow-cylindrical portion which at its end towards the valve seat has at least one orifice so that in the opened condition of the valve fluid can flow out of the inlet passage through the hollow-cylindrical portion of the shut-off body, through the orifice in the hollow-cylindrical portion and further between the sealing surfaces into the outlet passage.

In an embodiment in which the guide bush forms a hollow cylinder with an inside diameter and the guide portion of the shut-off body also has a cylindrical outside contour with an outside diameter, it is advantageous if the inside diameter and the outside diameter differ from each other by 0.5 mm to 2 mm and preferably 0.8 mm to 1.5 mm. In that way an annular gap is provided between the guide bush and the guide portion, which permits tilt-free guidance of the guide portion in the guide bush.

In an embodiment of the invention the guide portion of the shut-off body, that extends into the inlet passage, is of an overall length which is such that when the shut-off body is in a position of completely opening the valve the guide portion is still disposed at least over a length in the guide bush, that is at least half and preferably two thirds of the overall length of the guide portion.

In that way, when even still in the opened condition of the valve, that is to say when the guide portion of the shut-off body is pulled a distance out of the guide bush to move the sealing surfaces of the shut-off body and the valve seat away from each other, this ensures adequate guidance for the shut-off body.

In an embodiment of the invention the separating diaphragm has an operative surface A1 to which a fluid in the housing is applied in such a way that it exerts a force in opposite relationship to the spring force of the spring element and the shut-off body has an operative surface A2 to which the fluid in the housing is applied in such a way that it exerts a force in the direction of the spring force of the spring element on the shut-off body, wherein the surfaces A1 and A2 are so selected that the forces applied thereto substantially compensate each other in a direction parallel to the spring force of the spring element and in a direction in opposite relationship to the spring force of the spring element.

Such a configuration of the surfaces A1 and A2 leads to hydrostatic compensation of the valve arrangement so that the forces which act on the valve and the shut-off body respectively by virtue of the pressure of the fluid in the outlet passage, in and in opposite relationship to the direction of the spring force, just cancel each other out. This ensures that the force required to open the valve or the pressure of the fluid in the inlet passage is determined substantially exclusively by the spring force of the spring element. The valve is thus almost free from the action of back pressure.

In an embodiment of the invention the sealing surface of the shut-off body is formed by at least one sealing ridge extending in the peripheral direction. Such a configuration makes it possible for the shut-off body to be designed in one piece. The sealing ridge has sufficient flexibility to provide effective sealing integrity between the sealing surface of the shut-off body and the sealing surface of the valve seat.

In that respect it is particularly advantageous if the shut-off body is made from a softer plastic material than the valve seat.

Further advantages, features and possible uses of the present invention will be apparent from the description hereinafter of an embodiment and the related Figures.

Figure 1:
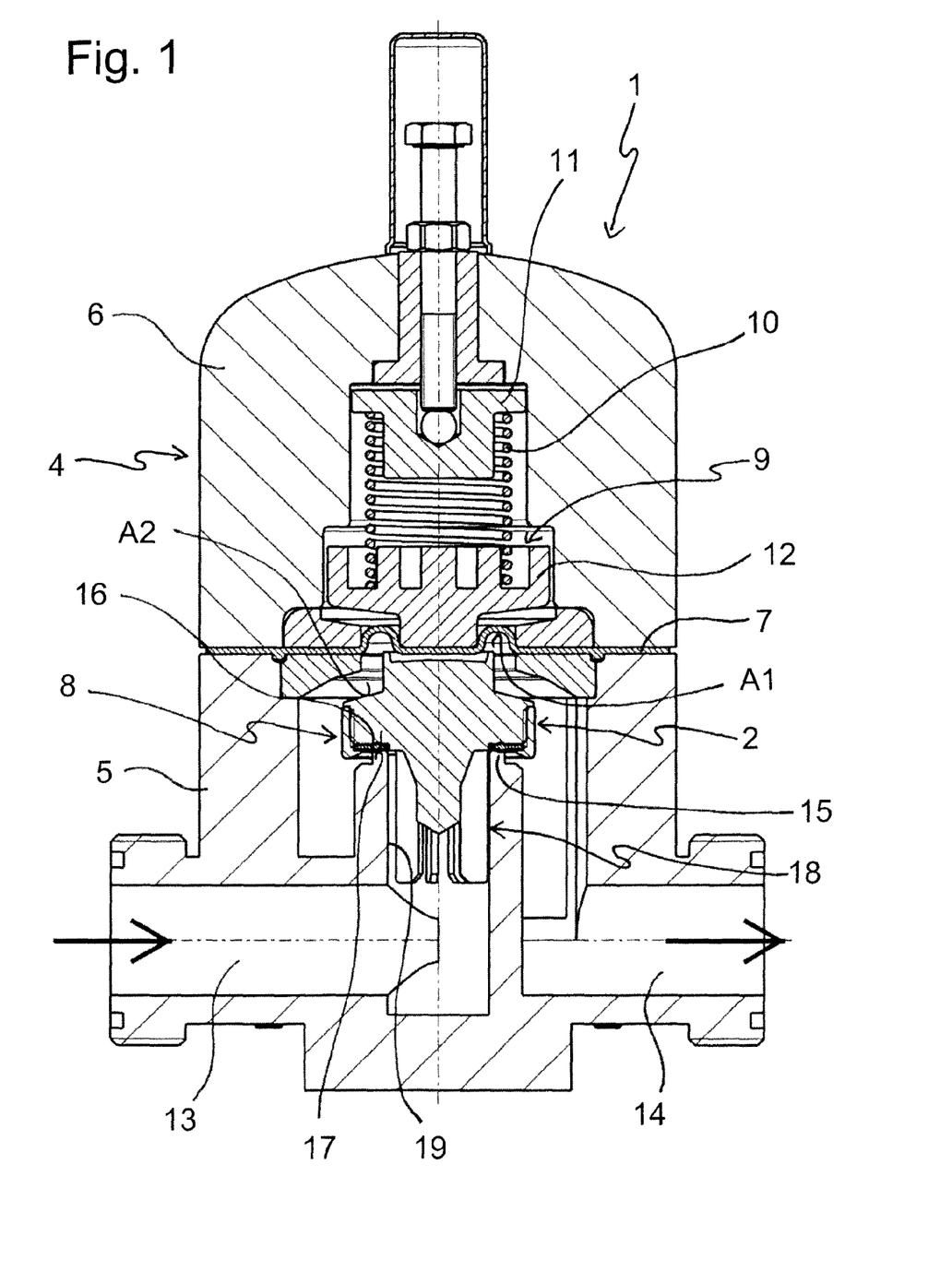
FIG. 1 shows a sectional view through an embodiment of the pressure retention valve according to the invention.

FIG. 1 shows a pressure retention valve 1 according to the invention with a first embodiment of the associated shut-off body or valve piston 2. The pressure retention valve 1 further has a housing 4 having a lower housing portion 5 and an upper housing portion 6. In this case the upper housing portion 6 and the lower housing portion 5 are connected together in such a way that clamped between them is a separating diaphragm 7 subdividing the housing 4 into a fluid-conveying portion 8 and a fluid-free portion 9.

A coil spring 10 is arranged as a spring element in the fluid-free portion 9 without the influences of the possibly attacking fluid to be conveyed. The coil spring 10 is supported at the housing side against an adjustable support 11 and at its free end presses against a ram 12 guided movably in the upper housing portion 6. The ram 12 in turn transmits the spring force of the spring 10 to the valve piston 2 by way of the separating diaphragm 7.

An inlet passage 13 and an outlet passage 14 through which the fluid to be conveyed flows are arranged in the fluid-conveying portion 8 of the housing 4. A housing-side valve seat 15 having a sealing surface 16 defines the transition between the inlet passage 13 and the outlet passage 14, that is to say the end of the inlet passage 13 and the start of the outlet passage 14.

The spring force of the spring 10 urges the valve piston 2 by way of the ram 12 and the separating diaphragm 7 with its sealing surface 17 against the valve seat 15 of the housing 4. If the force exerted by the fluid applied to the valve piston in the inlet passage 13 exceeds the spring force of the spring 10 the valve is opened.

Above the valve seat 15, that is to say in the outlet passage 14 of the valve 1, the valve piston 2 shown in FIG. 1 does not have a guide but has a guide portion 18 extending into the inlet passage 13. In that region the inlet passage 13 is in the form of a guide bush 19 in which the guide portion 18 is movably guided.

Figure 2:
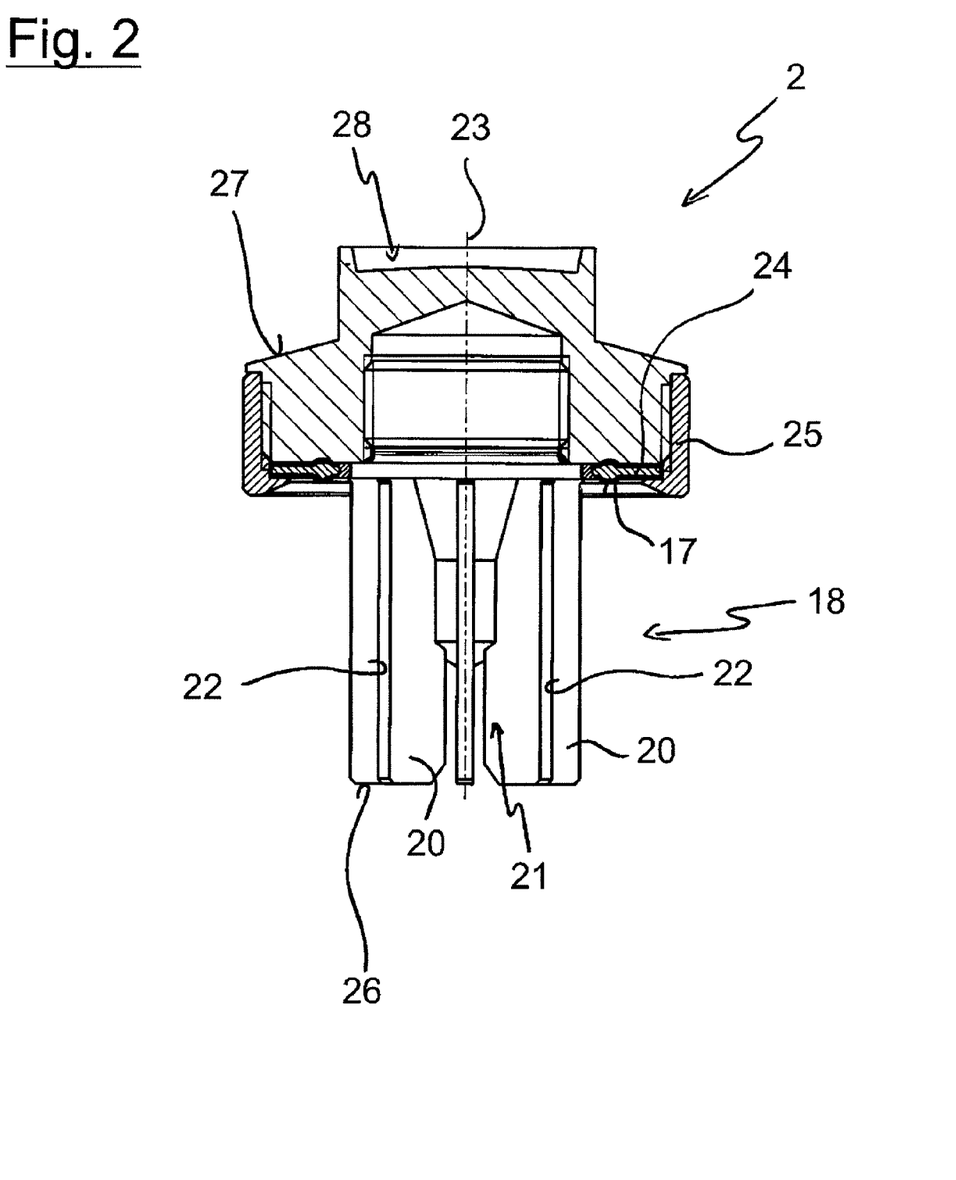
FIG. 2 shows a partly sectional view through the shut-off body of the pressure retention valve of FIG. 1.
Figure 3:
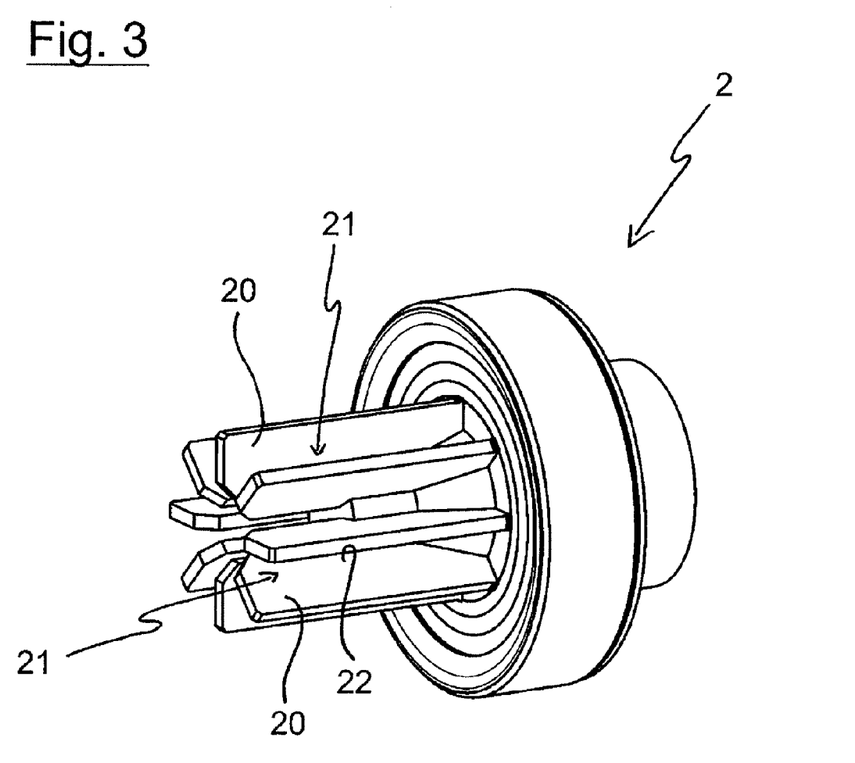
FIG. 3 shows a three-dimensional view of the shut-off body of FIG. 2.

The details of the valve piston 2 are shown more clearly in FIGS. 2 and 3, a sectional view and a three-dimensional view of the piston respectively. In the illustrated embodiment the guide portion 18 comprises eight guide vanes 20 which extends substantially radially. Assuming that the valve piston 2 is of a cylindrical basic shape the guide vanes 20 extend along the radius of the cylinder and are spaced from each other in the peripheral direction. In that way formed between the guide vanes 20 are flow passages 21 through which the fluid conveyed in the inlet passage 13 flows substantially parallel to the axis of the cylindrical configuration of the guide bush 19.

The outer end faces 22 of the guide vanes 20 are disposed on a circle of constant radius around the cylinder axis 23 of the piston. In this case the radius on which the outer end faces 22 of the guide vanes 20 are disposed is somewhat smaller than the inside radius of the guide bush 19. That ensures stable lateral guidance for the valve piston 2 in the guide bush 19 of the inlet passage 13. No fouling can be deposited in the gap between the end faces 22 of the guide vanes 20 and the bush 19 due to a through-flow of fluid, which occurs regularly in operation, through the region of the guide bush 19.

The guide vanes 20 extend as far as the sealing surface 17 of the valve piston 2 so that, when the valve is opened, that is to say when the valve piston 2 is pulled a distance out of the bush 19, the fluid to be conveyed can flow through the flow passages 21 between the sealing surfaces 16, 17 of the valve seat 15 and of the valve piston 2 respectively and thus reaches the outlet passage 14 of the valve 1.

In the illustrated embodiment the housing 4 and the valve piston are made from polyvinylidene fluoride (PVDF) which has extremely good chemical resistance. To ensure a good and low-wear seal in respect of the two mutually meeting sealing surfaces 16, 17 of the piston 2 and the valve seat 15 the sealing surface 17 of the valve piston 2 is formed by a sealing ring 24. The sealing ring 24 comprises an elastic core of a fluoroelastomer, here Viton, and a chemically resistant sheath of PTFE. The sealing ring 24 is screwed on the body of the valve piston 2 by means of a cap nut 25.

In operation of the valve 1 a fluid is generally present under pressure in the outlet passage 14. The forces related to the pressure of the fluid act on all surfaces of the outlet passage, that is to say also on the surfaces of the valve piston 2 and the surface of the separating diaphragm 7. The forces of the fluid that act on the separating diaphragm 7 acts substantially in opposite relationship to the spring force of the coil spring 10 and reduce its effective spring force. In contrast the forces acting at those surfaces 27 of the valve piston 2, which are disposed substantially perpendicularly to the axis of symmetry 23 of the valve piston or have components in that direction act in the direction of the spring force of the spring element 10. In the illustrated embodiment therefore the corresponding surfaces 27 of the valve piston 2 and the surfaces of the separating diaphragm 7, that are acted upon with fluid, are so selected that the forces acting thereon in directions parallel to the axis of symmetry 23 precisely compensate for each other. The pressure retention valve 1 is therefore compensated almost free from the action of back pressure or hydrostatically. The force with which the valve piston 2 is pressed against the valve seat 5 depends substantially only on the adjustable spring force of the coil spring 10.

Figure 4:
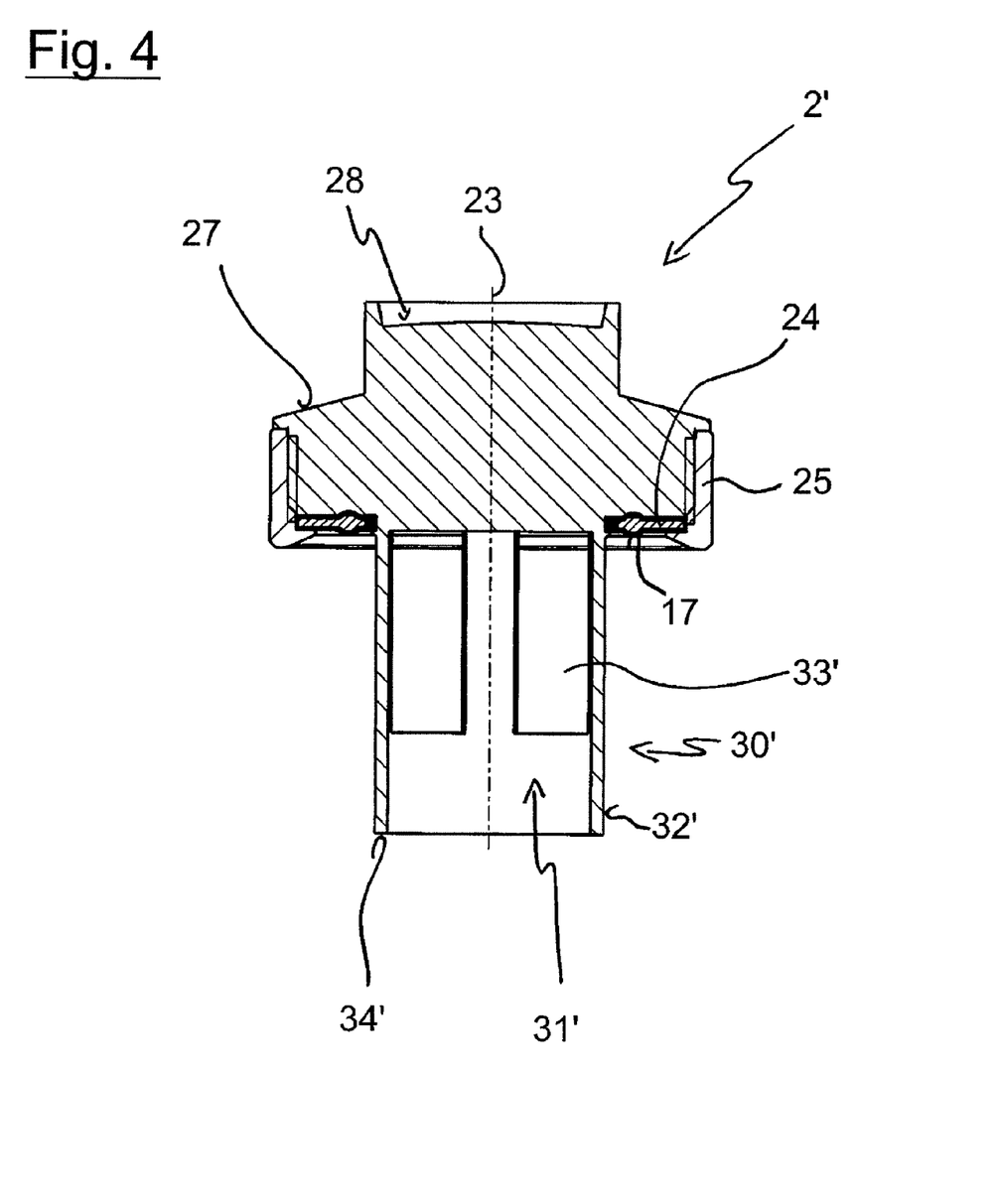
FIG. 4 shows a sectional view through an alternative embodiment of a shut-off body according to the invention.
Figure 5:
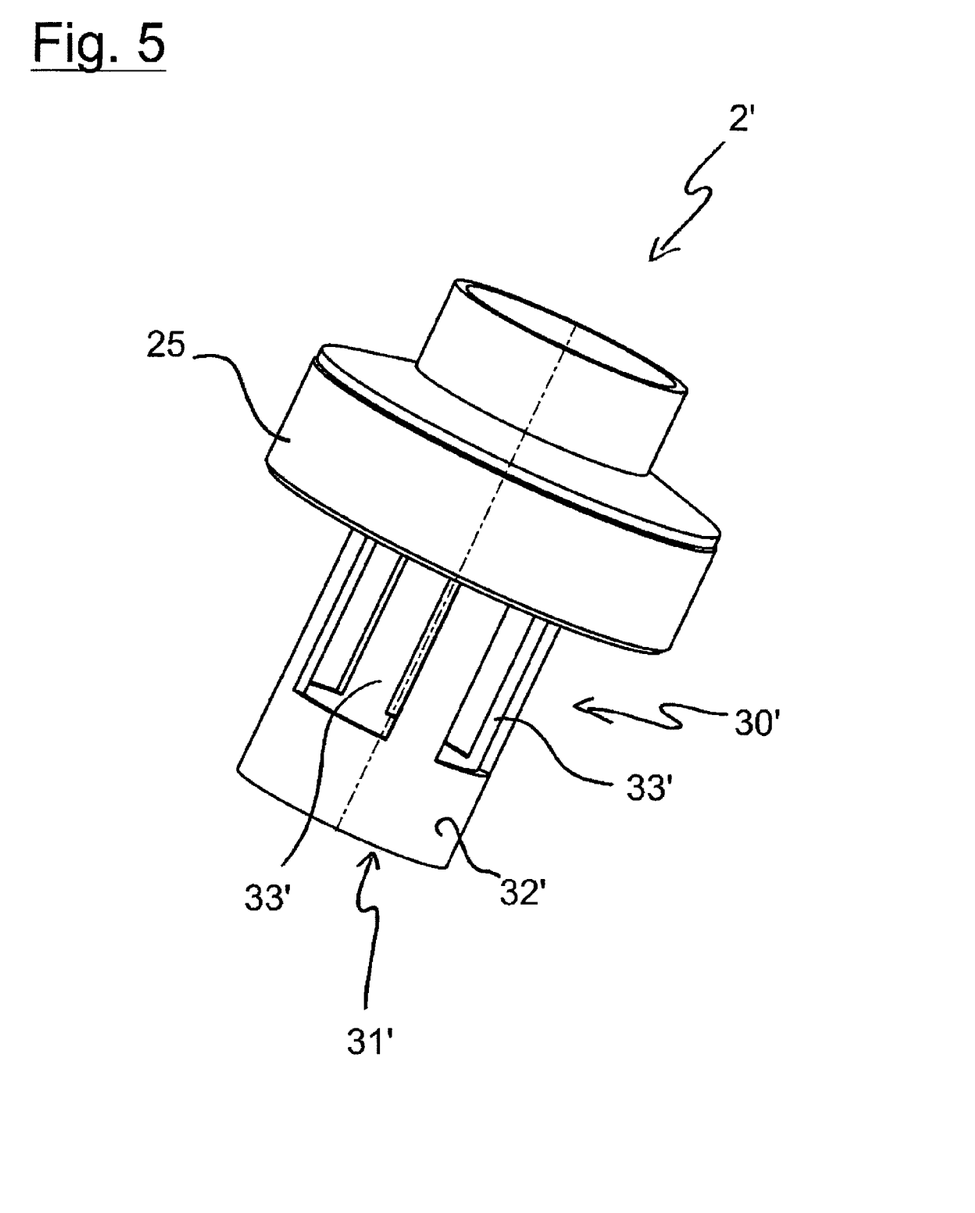
FIG. 5 shows a three-dimensional view of the shut-off body of FIG. 4, FIGS. 6a) and b) show sectional views through an alternative embodiment of a shut-off body according to the invention.

FIGS. 4 and 5 show an alternative embodiment of the valve piston 2'. It could replace the valve piston 2 of the pressure retention valve 1 in FIG. 1 without further modification. Instead of the guide vanes 20 the valve piston 2' in FIGS. 4 and 5 has a hollow-cylindrical portion 30' as the guide portion. The fluid can flow through the free internal space 31' of the guide portion 30'. As before the outside radius of the guide portion 30' is such that a small annular gap is formed between the outside wall 32' of the guide portion 30' and the guide bush 19.

At its upper end towards the sealing surface the hollow guide cylinder 30' has four orifices 33' through which the fluid flows between the sealing surfaces 16, 17 and thus passes into the outlet passage 14. The other components of the valve piston 2' are of a similar design configuration to the first embodiment of the valve piston 2 in FIGS. 1 to 3 and are therefore denoted by the same references in FIGS. 4 and 5 as in FIGS. 1 to 3.

Both embodiments of the valve pistons 2, 2' are of an overall length for the guide portion 18 and 30' respectively, measured from the sealing surface 17 to the lower edge 26 and 34' respectively, which is just so long that, when the valve is completely opened, only a maximum of 50% of the overall length of the guide portion 18 or 30' is pulled out of the guide bush 19 of the housing 4. That avoids tilting of the valve pistons 2, 2' and ensures trouble-free operation of the valve 1.

In both embodiments in FIGS. 1 to 3 and FIGS. 4 and 5 provided at the upper end of the valve piston 2' is a recess 28 as a receiving means for the ram 12. The ram 12 is in engagement by way of the separating diaphragm 7 with that receiving means in the piston 2, 2'. In alternative embodiments however the ram can be screwed to the piston or connected thereto in some other fashion mechanically.

Figure 6:
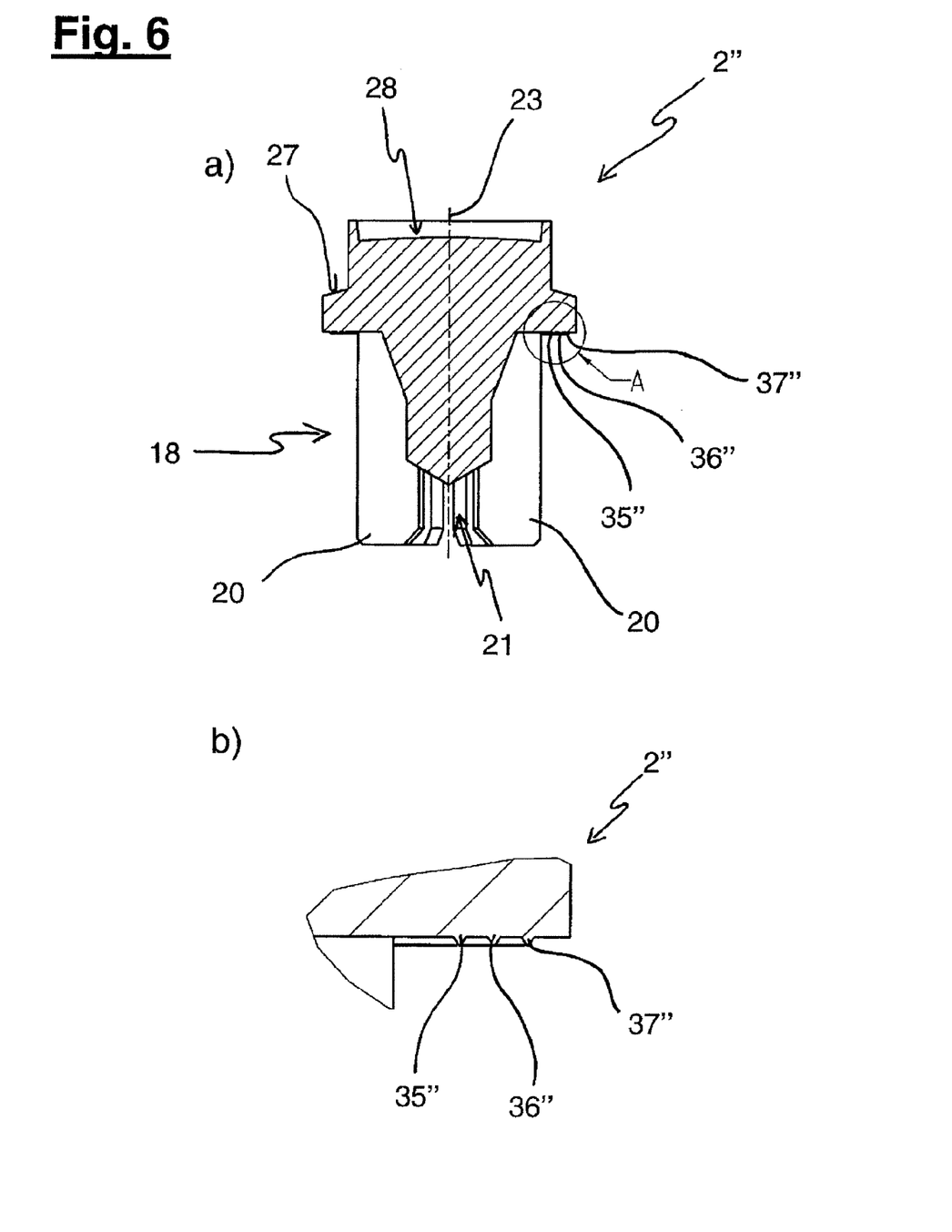

FIGS. 6*a*) and *b*) show sectional views through an alternative embodiment of a shut-off body or valve piston 2" according to the invention. The valve piston shown in FIGS. 6*a*) and *b*) substantially corresponds in its basic structure to the valve piston 2 as shown in FIGS. 1 to 3. The valve piston 2 of FIG. 1 could be replaced by the valve piston 2" of FIGS. 6*a*) and *b*) without limitation. FIG. 6*b*) shows a view on an enlarged scale of the portion A in FIG. 6*a*). In comparison with the valve piston 2 of FIGS. 1 to 3, a two-part structure for the valve piston or shut-off body 2 and sealing ring 24 was dispensed with. Instead three sealing ridges 35", 36" and 37" are injected into the edge of the piston, that forms the sealing surface of the valve piston 2". In addition the valve piston 2" is made from a PVDF material which is softer than the housing 4. The three sealing ridges 35", 36", 37" come into engagement with the sealing surface 16 of the valve seat 15 of the valve housing 4 and provide effective sealing integrity. The described structure makes it possible to dispense with the sealing ring 24 and the cap nut 25 and nonetheless to achieve good valve sealing integrity.

Figure 7:
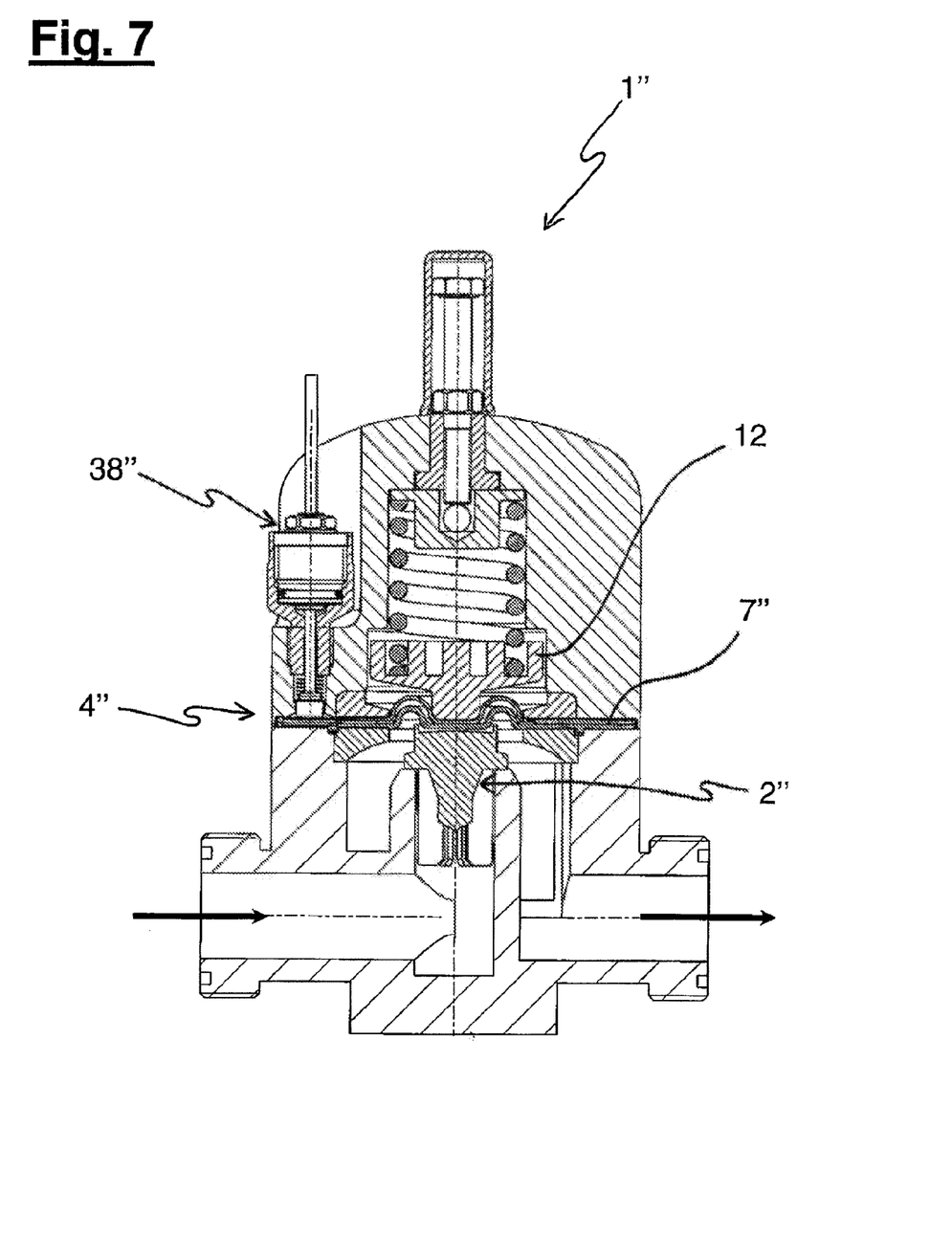
FIG. 7 shows a sectional view through an alternative embodiment of a pressure retention valve with a shut-off body as shown in FIGS. 6a) and b) with diaphragm rupture signalling.

FIG. 7 shows a sectional view through an embodiment of a pressure retention valve 1" according to the invention with diaphragm rupture signalling. Fitted in the pressure retention valve 1" is a shut-off body as is shown in FIGS. 6*a*) and 6*b*). The housing 4" is of a similar structure to the housing 4 of the valve in FIG. 1. In addition however it has a motion sensor 38" which detects the edge region of the separating diaphragm 7". The separating diaphragm 7" is of a structure as is described in EP 1 384 891 B1 for the diaphragm of a diaphragm pump.

The security diaphragm 7" used in the embodiment in FIG. 7 comprises two diaphragm layers which are arranged in mutually superposed relationship, wherein those diaphragm layers are connected sealingly to each other to prevent an ingress of liquid and/or gas at all edge regions at which liquid or gas could penetrate between the diaphragm layers. The mutually superposed diaphragm layers are thus liquid-tightly and gas-tightly connected together at least at their peripheral edge and, if present, at the through openings in the clamping region and in the centre at the ram 12. The other mutually facing surfaces of the mutually superposed diaphragm layers bear against each other without a fixed connection.

Upon damage to one of the mutually superposed diaphragm layers during operation fluid to be conveyed through the valve penetrates into the intermediate space between the mutually superposed diaphragm layers whereby the pressure within that intermediate space is increased from atmospheric or sub-atmospheric pressure to the pressure in the hydraulic fluid or fluid being conveyed. Because the mutually superposed diaphragm layers are not fixedly connected together over their full area the pressure or penetrating fluid can spread between the diaphragm layers as far as the sensor region of the diaphragm. The portion of the sensor region of the diaphragm 7", where the pressure sensor 38" is in engagement therewith, is of such a nature that in that portion the diaphragm layers oppose less resistance to the increased pressure and deform more easily than the diaphragm layers in the other portions of the diaphragm. In the event of diaphragm rupture and an increase in pressure that this entails between the diaphragm layers the portion of the sensor region is urged apart with an increase in the spacing between the mutually opposite surfaces of diaphragm layers. That is detected by the pressure sensor 38".

LIST OF REFERENCES

1, 1" pressure retention valve
2, 2', 2" valve piston
4 housing
5 lower housing portion
6 upper housing portion
7, 7" separating diaphragm
8 fluid-conveying portion
9 fluid-free portion
10 coil spring
11 support
12 ram
13 inlet passage
14 outlet passage
15 valve seat
16, 17 sealing surface
18 guide portion
19 guide bush
20 guide vane
21 flow passage
22 end face
23 cylinder axis of the valve piston 2
24 sealing ring
25 cap nut
26 lower edge of the guide portion 18
27 surface of the piston
28 recess
30' hollow-cylindrical guide portion
31' inside wall of the guide portion
32' outside wall
33' orifice
34' lower edge of the guide portion 30'
35",36",37" sealing ridge
38" pressure sensor

The invention claimed is:

1. A pressure retention valve comprising
    a housing having an inlet passage and an outlet passage, wherein the inlet passage and the outlet passage can be connected together,
    a separating diaphragm subdividing the housing into two portions, a first portion conveying fluid in operation of the valve and a second fluid-free portion,
    a valve seat which is arranged into the fluid-conveying portion of the housing and has a first sealing surface, wherein the valve seat defines an end of the inlet passage,
    a shut-off body which is arranged movably in the fluid-conveying portion of the housing and has a second sealing surface, and
    a spring element having a spring force, which is arranged in the fluid-free portion of the pressure retention valve,
    wherein the spring element is so arranged that its spring force prestresses the second sealing surface of the shut-off body in the direction towards the first sealing surface of the valve seat so that in a position of the shut-off body that closes the pressure retention valve the sealing surfaces are in engagement with each other and the shut-off body separates the inlet passage from the outlet passage,
    wherein the inlet passage is so arranged that in operation of the valve a fluid flowing in through the inlet passage is applied to the shut-off body in such a way that the fluid exerts on the shut-off body a force which acts in opposition to the spring force of the spring element,
    wherein the shut-off body has a guide portion which extends into the inlet passage,
    wherein the inlet passage is portion-wise of such a design configuration that it forms a guide bush in which the guide portion of the shut-off body is guidedly received,
    wherein the guide portion of the shut-off body, which extends into the inlet passage, is of an overall length which is such that when the shut-off body is in a position of completely opening the valve, the guide portion is still disposed in the guide bush,
    wherein a gap is provided between the guide bush and the guide portion, which permits tilt-free guidance of the guide portion in the guide bush,
    wherein the separating diaphragm has a first operative surface to which a fluid in the housing is applied in such a way that it exerts a force in an opposite direction to the spring force of the spring element and the shut-off body has a second operative surface to which the fluid in the housing is applied in such a way that it exerts a force in the direction of the spring force of the spring element on the shut-off body, and
    wherein the first and second operative surfaces are configured such that the forces applied thereto substantially compensate each other.

2. The pressure retention valve according to claim 1, wherein the guide bush is of a substantially hollow-cylindrical shape with a cylindrical inside wall which delimits the volume of the inlet passage and provides the guidance for the guide portion.

3. The pressure retention valve according to claim 1, wherein the guide portion has at least one passage which extends substantially parallel to the inlet passage of the housing and through which the fluid to be conveyed flows in operation of the valve.

4. The pressure retention valve according to claim 1, wherein the guide portion has at least one passage extending in a direction perpendicularly to the direction of the guide bush in the inlet passage.

5. The pressure retention valve according to claim 1, wherein the guide portion has a plurality of guide vanes extending substantially in the radial direction and spaced from each other in a peripheral direction so that in an opened condition of the valve, fluid can flow out of the inlet passage through the guide portion of the shut-off body and through an intermediate space between the first and second sealing surfaces into the outlet passage.

6. The pressure retention valve according to claim 1, wherein the guide portion has a hollow-cylindrical portion which at its end towards the valve seat has at least one orifice so that in an opened condition of the valve, fluid can flow out of the inlet passage through the hollow-cylindrical portion of the shut-off body through the orifice in the hollow-cylindrical portion and further through an intermediate space between the first and second sealing surfaces into the outlet passage.

7. The pressure retention valve according to claim 1, wherein the guide bush forms a hollow cylinder with an inside diameter and the guide portion of the shut-off body has an outside diameter, wherein the inside diameter and the outside diameter differ from each other by 0.5 mm to 2 mm.

8. The pressure retention valve according to claim 1, wherein the guide portion of the shut-off body, that extends into the inlet passage, is of an overall length which is such that when the shut-off body is in a position of completely opening the valve the guide portion is still disposed at least over a length in the guide bush, that is at least half of the overall length of the guide portion.

9. The pressure retention valve according to claim 1, wherein the second sealing surface is formed by at least one sealing ridge extending in a peripheral direction.

10. The pressure retention valve according to claim 9, wherein the shut-off body is made from a softer plastic material than the valve seat.

11. The pressure retention valve according to claim 7, wherein the inside diameter and the outside diameter differ from each other by 0.8 mm to 1.5 mm.

12. The pressure retention valve according to claim 1, wherein the guide portion of the shut-off body, that extends into the inlet passage, is of an overall length which is such that when the shut-off body is in a position of completely opening the valve the guide portion is still disposed at least over a length in the guide bush, that is at least two thirds of the overall length of the guide portion.

* * * * *